United States Patent

Ozawa et al.

[11] Patent Number: 5,336,025
[45] Date of Patent: Aug. 9, 1994

[54] MULTI-SPINDLE MACHINE TOOL

[75] Inventors: Akira Ozawa; Taizo Matsuyama; Eiichi Homma; Syunroku Hata; Kenzaburo Matsuo; Kazushige Nakatsuka, all of Sayama, Japan

[73] Assignee: Honda Giken Kogyo Kabushiki Kaisha, Tokyo, Japan

[21] Appl. No.: 986,734

[22] Filed: Dec. 8, 1992

[30] Foreign Application Priority Data

Dec. 16, 1991 [JP] Japan ................................ 3-332171
Feb. 24, 1992 [JP] Japan ................................ 4-036716

[51] Int. Cl.$^5$ ............................................ B23B 39/16
[52] U.S. Cl. ............................ 408/46; 408/43; 408/53
[58] Field of Search ............ 408/43, 46, 53, 42; 82/129, 121

[56] References Cited

U.S. PATENT DOCUMENTS

| | | | |
|---|---|---|---|
| 2,757,560 | 8/1956 | Ridgway | 408/46 |
| 3,543,392 | 12/1967 | Perry et al. | |
| 4,059,162 | 11/1977 | Zbinden et al. | 408/53 |
| 4,730,373 | 3/1988 | Senoh | 408/46 |
| 4,915,549 | 4/1990 | Riddell | 408/43 |
| 5,076,123 | 12/1991 | McConkey | 408/43 |

FOREIGN PATENT DOCUMENTS

| | | | |
|---|---|---|---|
| 0034204 | 2/1985 | Japan | 408/53 |
| 0218007 | 9/1987 | Japan | 408/53 |
| 0024014 | 1/1990 | Japan | 408/53 |

Primary Examiner—P. Austin Bradley
Assistant Examiner—Eric R. Puknys

[57] ABSTRACT

A multi-spindle machine tool having separately and vertically movable first and second spindle units which are mounted on a main body thereof movable toward and away from a workpiece. A first vertically movable table is supported by a pair of guide rails provided on a frontal surface of the main body opposing to the workpiece. The first vertically movable table can be ascended and descended by a first actuator. A second vertically movable table is supported by a pair of guide rails provided on a frontal surface of the first vertically movable table opposing to the workpiece. The second vertically movable table can be ascended and descended by a second actuator. The first and second spindle units are fixed onto the first and second vertically movable tables respectively. Thus, the area of the first vertically movable table to be supported by the main body can be set to a relatively large value and the rigidity of the first vertically movable table can be kept effectively. Further, the rigidity of the second vertically movable table can also be ensured, thereby making it possible to reliably hold the first and second spindle units and to efficiently carry out various machining processes.

6 Claims, 16 Drawing Sheets

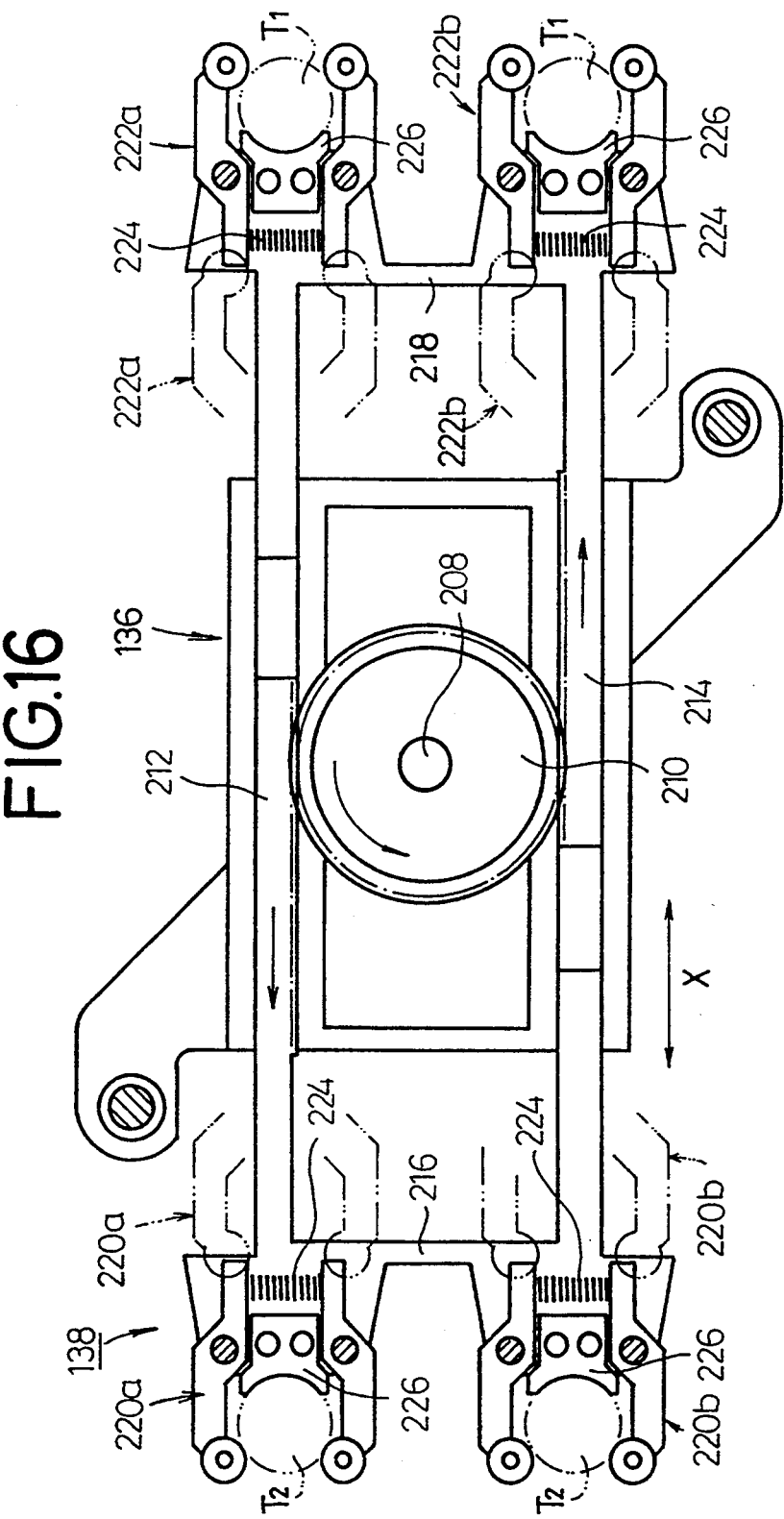

MULTI-SPINDLE MACHINE TOOL

BACKGROUND OF THE INVENTION

1. Field of the Invention

The present invention relates to a multi-spindle machine tool having separately and vertically movable first and second spindle units mounted on a main body thereof which is movable toward and away from a workpiece, and to a tool changer suitable for use in the multi-spindle machine tool.

2. Description of the Related Art

In an NC (numerically controlled) machine tool, a workpiece is normally machined by a single spindle. It has therefore been pointed out that a problem in such an NC machine tool is that when a workpiece needs to be subjected to a plurality of machining processes, the efficiency of machining is reduced. Many improvements in the NC machine tool have been made to solve such a problem. A machine tool having two pairs of spindle heads mounted on a single column is now used as has been disclosed in Japanese Laid-Open Patent Publication No. 59-69242, for example.

In the prior art, however, the two pairs of spindle heads are supported on the same column so as to be vertically movable by an actuator. Further, distances between respective tools fixed to the respective spindle heads are fixed. Therefore, the respective tools cannot be set so as to be adaptable to workpieces of different kinds, thereby causing a problem that such a machine tool cannot be used widely. Further, when there exist two portions in a workpiece to be machined which are close to each other, because of the difficulty in simultaneously machining the two portions, the machining efficiency is reduced.

Therefore, the present applicant has proposed a two-spindle machine tool which has first and second spindles supported by a movable table which is slidably supported on guide rails mounted on a main body of the machine tool. The proposed machine tool is also provided with a feed screw mechanism capable of adjusting the distance between the first and second spindles (see Japanese Laid-Open Utility Model Publication No. 62-138515). In the aforementioned machine tool, however, the movable table to which the respective spindles are fixed, extends in the direction of an axis of each spindle. It is therefore impossible to increase the supporting area of the movable table to be supported by the main body via the guide rails without interfering the workpiece. Thus, the rigidity of the movable table remains low and the use of a large spindle in particular will create a difficulty.

There has been used a tool changer of a type wherein a number of different tools are accommodated in a tool magazine and a desired tool is taken out from the tool magazine so that a tool which has been mounted on a spindle head of a machine tool is exchanged with a desired tool to meet various machining requirements. As has been disclosed in Japanese Laid-Open Utility Model Publication No. 63-110336, for example, there has been proposed an apparatus wherein a tool magazine for accommodating a plurality of tools therein is provided in the vicinity of a bed on which a main body having a plurality of main spindles is movably placed and a tool is automatically exchanged with a desired tool between the main spindles and the tool magazine.

In the above prior art, however, a guide member projecting toward the main body from the tool magazine is provided. Further, a chuck unit is provided so as to be movable along the guide member between the tool magazine and the main spindles. Therefore, the range of movement of the main body in its transverse direction is considerably restricted, thereby causing a problem that the range of machining of a workpiece by each spindle is limited.

In view of the foregoing problem, the present applicant has proposed a tool changer disclosed in Japanese Laid-Open Patent Publication No. 1-205945. However, this type of tool changer is used to simply exchange a single tool with another. Therefore, the tool changer cannot be used to simultaneously exchange a plurality of tools with others.

SUMMARY OF THE INVENTION

It is a principal object of the present invention to provide a multi-spindle machine tool wherein distances between adjacent respective tools can be easily adjusted so as to adapt to workpiece shapes to thereby enable an efficient machining process with spindles being reliably held.

A further object of the present invention is to provide a tool changer suitable for use in a multi-spindle machine tool, wherein two or more tools can be simultaneously exchanged with others between a plurality of spindles and a tool magazine, with an ensured range of machining of a workpiece by the spindles.

According to one aspect of the present invention, for achieving the above objects, there is provided a multi-spindle machine tool comprising a main body movable toward and away from a workpiece, a first vertically movable table supported by a pair of guide rails provided on a frontal surface of the main body opposing to the workpiece, the first vertically movable table being ascended and descended by a first actuator, a second vertically movable table supported by a pair of guide rails provided on a frontal surface of the first vertically movable table opposing to the workpiece, the second vertically movable table being ascended and descended by a second actuator, and first and second spindle units fixed respectively to the first and second vertically movable tables.

In the above multi-spindle machine tool, first and second support members for supporting the first and second spindle units in such a manner that the axes of the first and second spindle units extend in the direction which intersects the frontal surfaces of the first and second vertically movable tables, may be respectively formed on side portions, located on the same side, of the first and second vertically movable tables.

In the above multi-spindle machine tool, first and second main bodies may be provided side by side, and first and second vertically movable tables mounted to each of the first and second main bodies may respectively include first and second support members provided on each of opposite side portions of the first and second main bodies.

According to another aspect of the present invention, for achieving the above objects, there is provided a tool changer suitable for use in a multi-spindle machine tool, comprising a tool magazine provided on a side portion of a main body of the multi-spindle machine tool, the main body being movable in directions of axes of at least two or more vertically-movable spindles and in radial directions of the two or more spindles, which intersect the axial directions, the tool magazine being movable in the radial directions integrally with the main body, and an automatic exchange mechanism for enabling a simultaneous exchange of two or more tools between the tool magazine and the two or more spindles. The automatic exchange mechanism comprises a drive unit provided on the side portion of the main body, a gear case supported by the drive unit so as to be movable back and forth along the axial directions, a casing turnably supported by the gear case, and tool gripping means mounted on both sides of the casing, which extend in the radial directions, and capable of simultaneously gripping the two or more tools which have been held by the two or more spindles and the tool magazine respectively.

In the above tool changer, the tool magazine may be rotary about its horizontal axis and a plurality of sets of tools may be detachably supported on an outer peripheral wall of the tool magazine, each of the sets of tools including two or more tools corresponding to the two or more spindles.

In the above tool changer, the gear case may be disposed between the drive unit and the casing to transmit a driving force of the drive unit to the casing and the tool gripping means, and the gear case may protrude forward along the axis of the main body.

In the above tool changer, the tool gripping means may comprise two pair of upper and lower chucks provided on both sides of the casing, rack members for openably and closably supporting the chucks, and a pinion held in meshing engagement with the rack members and rotatably driven by the drive unit.

In the above tool changer, the drive unit may comprise a single rotatably-driven rotary shaft, first cam means held in engagement with the rotary shaft, for moving the casing back and forth, second cam means held in engagement with the rotary shaft, for moving the tool gripping means, and third cam means held in engagement with the rotary shaft, for turning the casing, the first through third cam means being selectively driven under the rotation of the rotary shaft.

In the above tool changer, the first cam means may comprise a cam mounted on the rotary shaft and having a screw-shaped cam groove defined in the outer periphery thereof, a swing arm having a swingably supported end and a roller fitted in the screw-shaped cam groove, and a drive shaft used to support the casing and held in engagement with the other end of the swing arm so as to be movable back and forth along the axis of the rotary shaft.

In the above tool changer, the second cam means may comprise a cam member mounted on the rotary shaft, a cam roller fitted in a groove defined in the cam member, a drive shaft held in engagement with the tool gripping means by a gear train disposed within the gear case, and a link mechanism to which the cam roller is fixed and which is held in engagement with the drive shaft.

In the above tool changer, the third cam means may comprise a parallel cam mounted on the rotary shaft, a rotor used to support a plurality of cam rollers held in meshing engagement with the parallel cam, and a turning shaft having one end coupled by spline to the rotor and the other end held in engagement with the casing by the gear train.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 16 is a front view showing a casing and tool gripping means of the tool changer shown in FIG. 9.

DETAILED DESCRIPTION OF THE PREFERRED EMBODIMENTS

Figure 1:
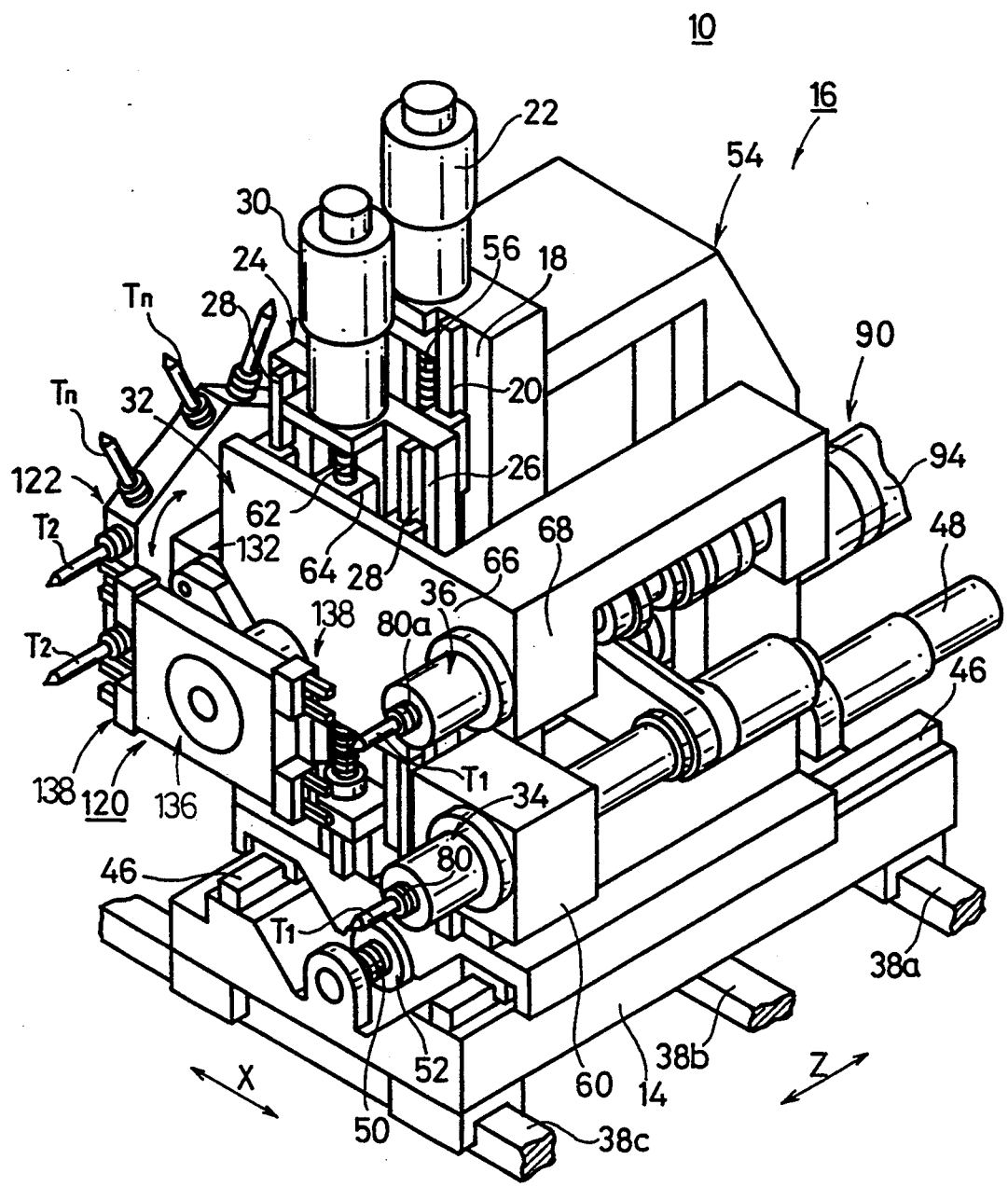
FIG. 1 is a fragmentary perspective view showing a multi-spindle machine tool according to one embodiment of the present invention.

Referring now to FIGS. 1 through 4, reference numeral 10 indicates a multi-spindle machine tool according to one embodiment of the present invention. The multi-spindle machine tool 10 comprises an X table 14 mounted on a foundation base 12 so as to be movable in the direction indicated by the arrow X, a main body 16 supported on the X table 14 so as to be movable in the direction indicated by the arrow Z, a first vertically movable table 24 which is supported by a pair of guide rails 20, 20 mounted on a frontal surface 18 of the main body 16 and which can be elevated by a first servomotor (actuator) 22, a second vertically movable table 32 which is supported by a pair of guide rails 28, 28 mounted on a frontal surface 26 of the first vertically movable table 24 and which can be elevated by a second servomotor (actuator) 30, and first and second spindle units 34, 36 which are respectively fixed to the first and second vertically movable tables 24, 32 and arranged along upward and downward directions.

Guide rails 38a through 38c and a first drive motor 40 are fixedly mounted on the foundation base 12. A ball screw 42, which is coupled to the first drive motor 40 and extends in the direction indicated by the arrow X, threadedly engages its corresponding nut 44 attached to the X table 14. A pair of guide rails 46, 46 and a second drive motor 48 are coupled to the X table 14. A ball screw 50, which is coupled to the second drive motor 48 and extends in the direction indicated by the arrow Z, threadedly engages its corresponding nut 52 attached to the main body 16.

The main body 16 includes a vertically-extending and elongated column 54. The first servomotor 22 is fixed to an upper portion of the column 54 so as to extend in the vertical direction. A ball screw 56 rotatably mounted to the first servomotor 22 is supported by a lower end of the column 54 and threadedly engages its corresponding nut 58 attached to the first vertically movable table 24 (see FIG. 5). Portions (corresponding to surfaces to be supported by the pair of guide rails 20, 20) of the first vertically movable table 24 are formed so as to be relatively wider. A first housing (support portion or member) 60 for supporting the first spindle unit 34 in such a manner that the axial line or axis of the first spindle unit 34 extends in the direction which intersects the frontal surface 26 of the first vertically movable table 24, is provided on a side portion of the first vertically movable table 24.

A second servomotor 30 is fixed to an upper portion of the first vertically movable table 24 so as to extend in the vertical direction. A ball screw 62, which is rotatably mounted to the second servomotor 30, is supported by a lower end of the frontal surface 26 of the first vertically movable table 24 and threadedly engages its corresponding nut 64 attached to the second vertically movable table 32 (see FIG. 1). Portions (corresponding to surfaces to be supported by the pair of guide rails 28, 28) of the second vertically movable table 32 are formed so as to be relatively wider. A second housing (support portion or member) 68 for supporting the second spindle unit 36 in such a manner that the axial line or axis of the second spindle unit 36 extends in the direction which intersects the frontal surface 66 of the second vertically movable table 32, is provided on a side portion of the second vertically movable table 32.

Figure 5:
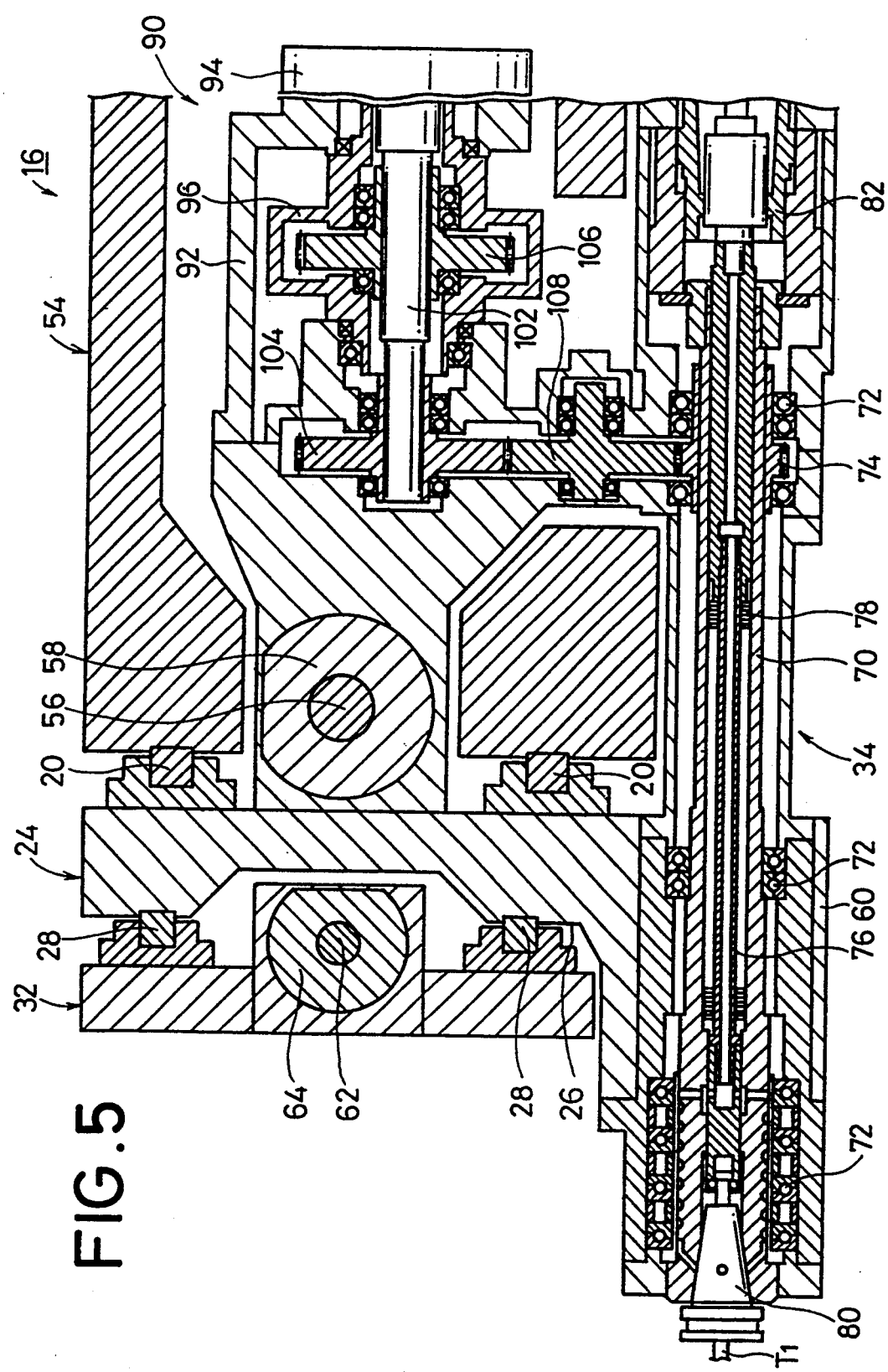
FIG. 5 is a transverse cross-sectional view illustrating a first spindle unit and a drive mechanism of the multi-spindle machine tool shown in FIG. 1.

As shown in FIG. 5, the first spindle unit 34 has a hollow spindle 70, which is rotatably supported within the first spindle unit 34 by a plurality of bearings 72 or the like. A toothed wheel or gear 74 is mounted on the outer peripheral wall of the spindle 70 and a rod 76 is disposed within the spindle 70 so as to be movable back and forth. The rod 76 is pressed toward the rear by a spring 78. A tool holder 80 engages coaxially with the leading end of the rod 76 and an unclamping cylinder mechanism 82 is coupled to the rear end of the rod 76.

The second spindle unit 36 is identical in structure to the first spindle unit 34. The same elements of structure as those employed in the first spindle unit 34 are identified by like reference numerals with a suffix a, and their detailed description will therefore be omitted (see FIGS. 6 and 7).

A drive mechanism 90 for rotatably driving the first spindle unit 34 and the second spindle unit 36 in a single unit is mounted to the first vertically movable table 24. The drive mechanism 90 has a motor 94 fixedly mounted on the first vertically movable table 24 by a drive-shaft housing 92. One end of a first gear case 96 is swingably mounted in the housing 92. A second gear case 98, which is rotatably brought into engagement with the other end of the first gear case 96, is swingably supported by the second spindle unit 36 (see FIGS. 5 through 8) The second gear case 98 is provided with a bracket 99 for holding the other end of the first gear case 96 therein.

Figure 6:
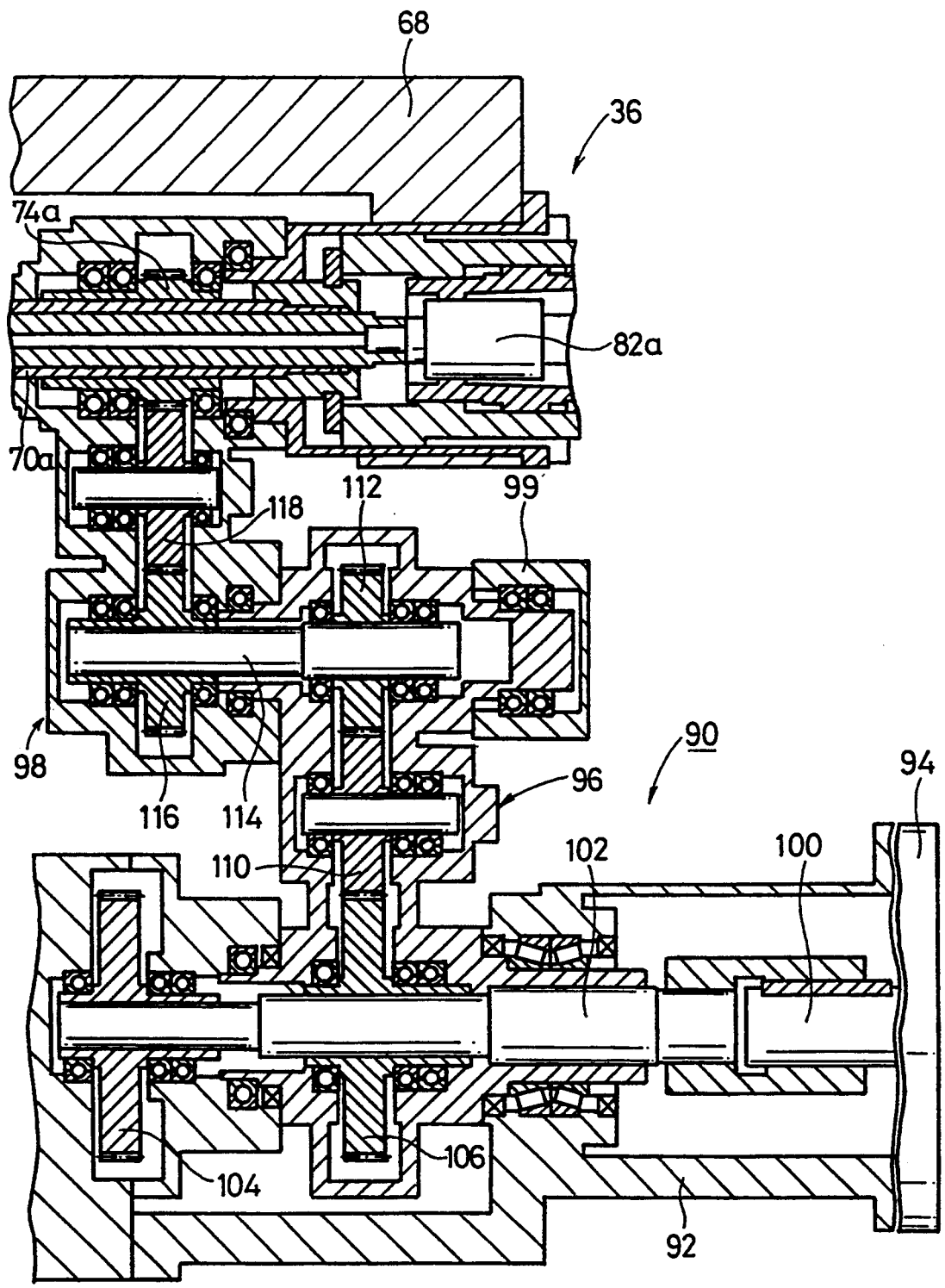
FIG. 6 is a vertical cross-sectional view showing a second spindle unit and a drive mechanism of the multi-spindle machine tool depicted in FIG. 1.
Figure 7:
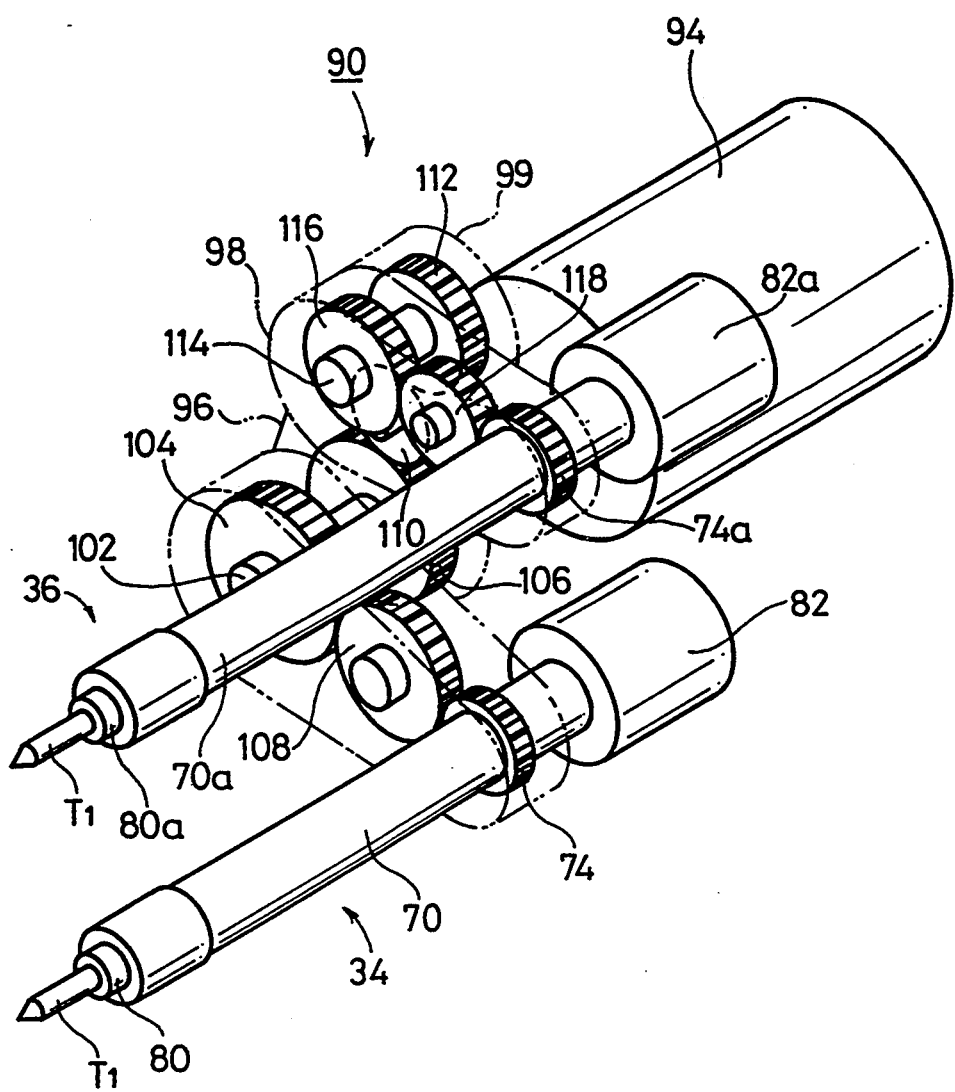
FIG. 7 is a perspective view showing the inside of the drive mechanism.
Figure 8:
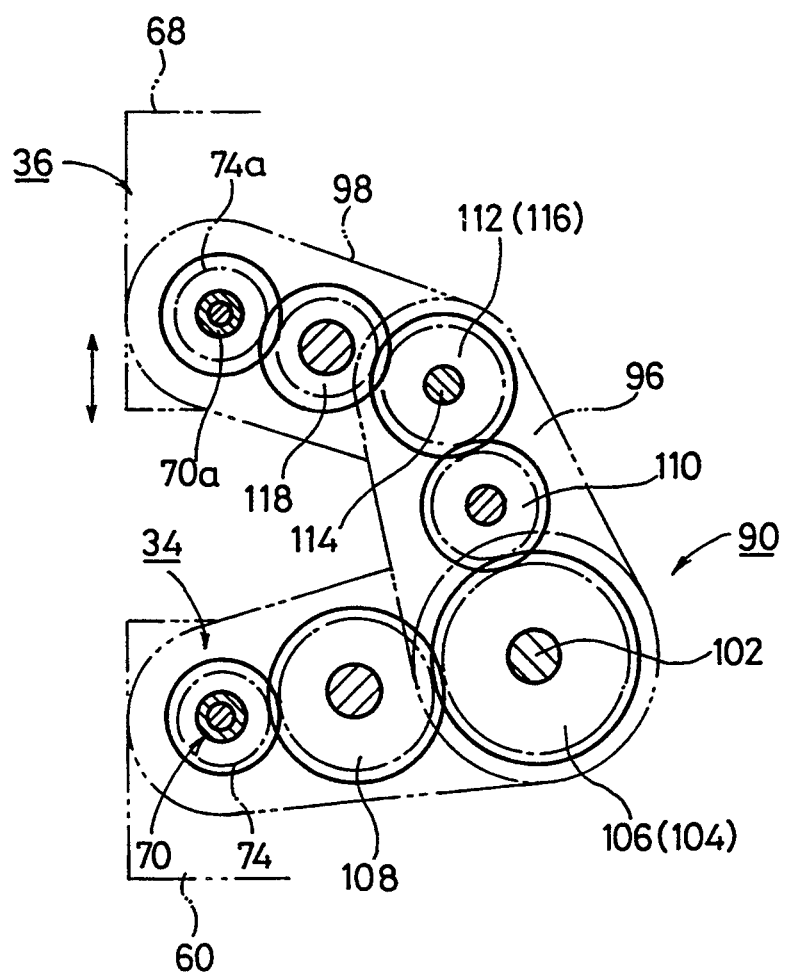
FIG. 8 is a rear elevational view illustrating the drive mechanism.

As shown in FIGS. 5 and 6, a rotary shaft 102 is coupled coaxially with a drive shaft 100 of the motor 94. A first driving gear 104 and a second driving gear 106 are coaxially fixed to the rotary shaft 102 so as to be spaced given intervals from the leading end of the rotary shaft 102. The first driving gear 104 is brought into meshing engagement with the gear 74 mounted on the spindle 70 of the first spindle unit 34 by a gear 108. The second driving gear 106 is disposed within the first gear case 96 and brought into meshing engagement with a gear 112 by a gear 110. A rotary shaft 114 for mounting the gear 112 thereon enters into the second gear case 98 so as to mount a gear 116 thereon. The gear 116 is brought into meshing engagement with a gear 118, which is in turn held in meshing engagement with a gear 74a mounted on a spindle 70a of the second spindle unit 36.

A tool changer 120 is mounted to a side portion of the column 54 of the main body 16, which is opposite to the side portions by which the first and second spindle units 34, 36 are supported.

Figure 2:
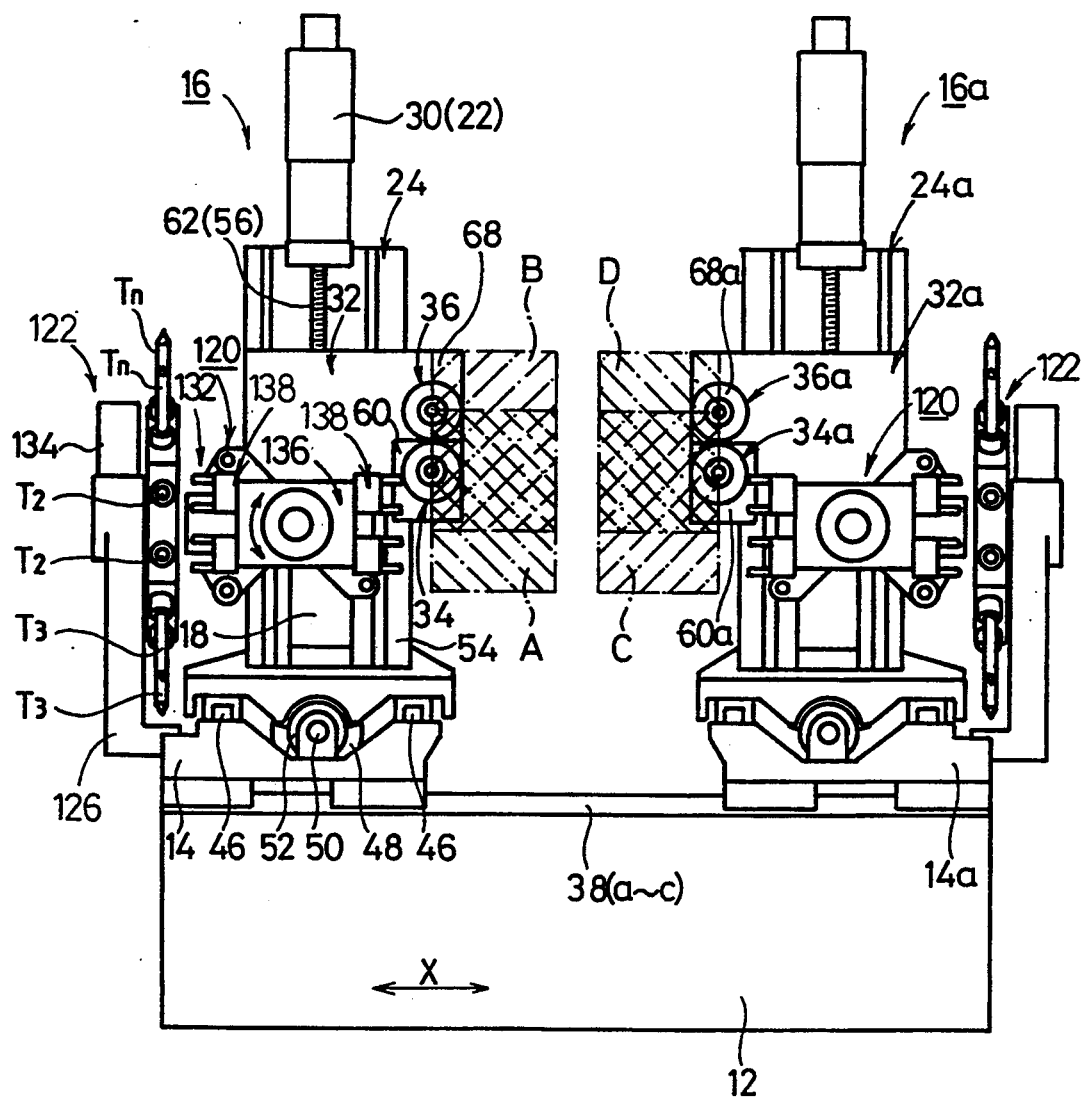
FIG. 2 is a front view showing the multi-spindle machine tool depicted in FIG. 1.
Figure 4:
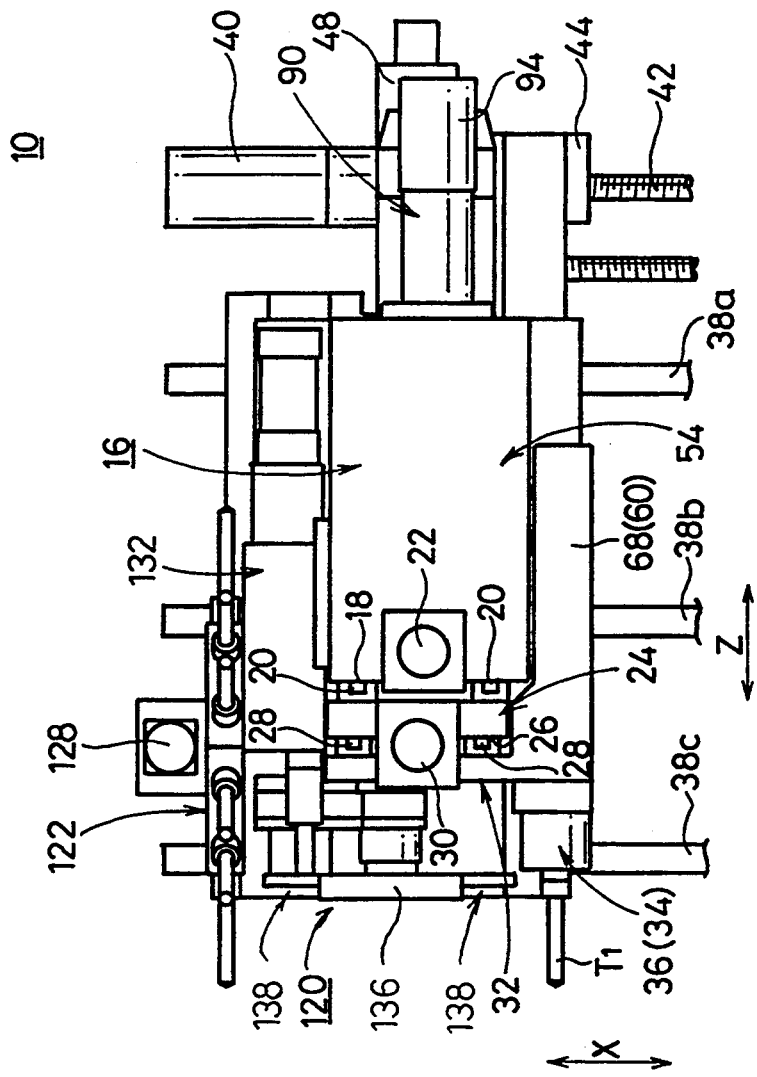
FIG. 4 is a fragmentary plan view showing the multi-spindle machine tool depicted in FIG. 1.

As shown in FIG. 2, the tool changer 120 comprises a tool magazine 122 placed on one side of the column 54 and mounted onto a side portion of the X table 14 so as to be movable integrally with the column 54 in the radial direction (i.e., in the direction indicated by the arrow X) of each of the first and second spindle units 34, 36, and an automatic exchange mechanism 124 which enables a simultaneous exchange of two or more tools (to be described later) between the tool magazine 122 and the first and second spindle units 34, 36 (see FIG. 4). The tool magazine 122 is shaped in the form of a polygon and supported on the side portion of the X table 14 by a mounting member 126. Further, the tool magazine 122 can be rotated by a motor 128 fixed to the mounting member 126. A plurality of pairs of tools $T_1$ through $T_n$, which are provided two by two on the outer peripheral wall of the tool magazine 122, are detachably held by their corresponding tool holders 130.

Figure 9:
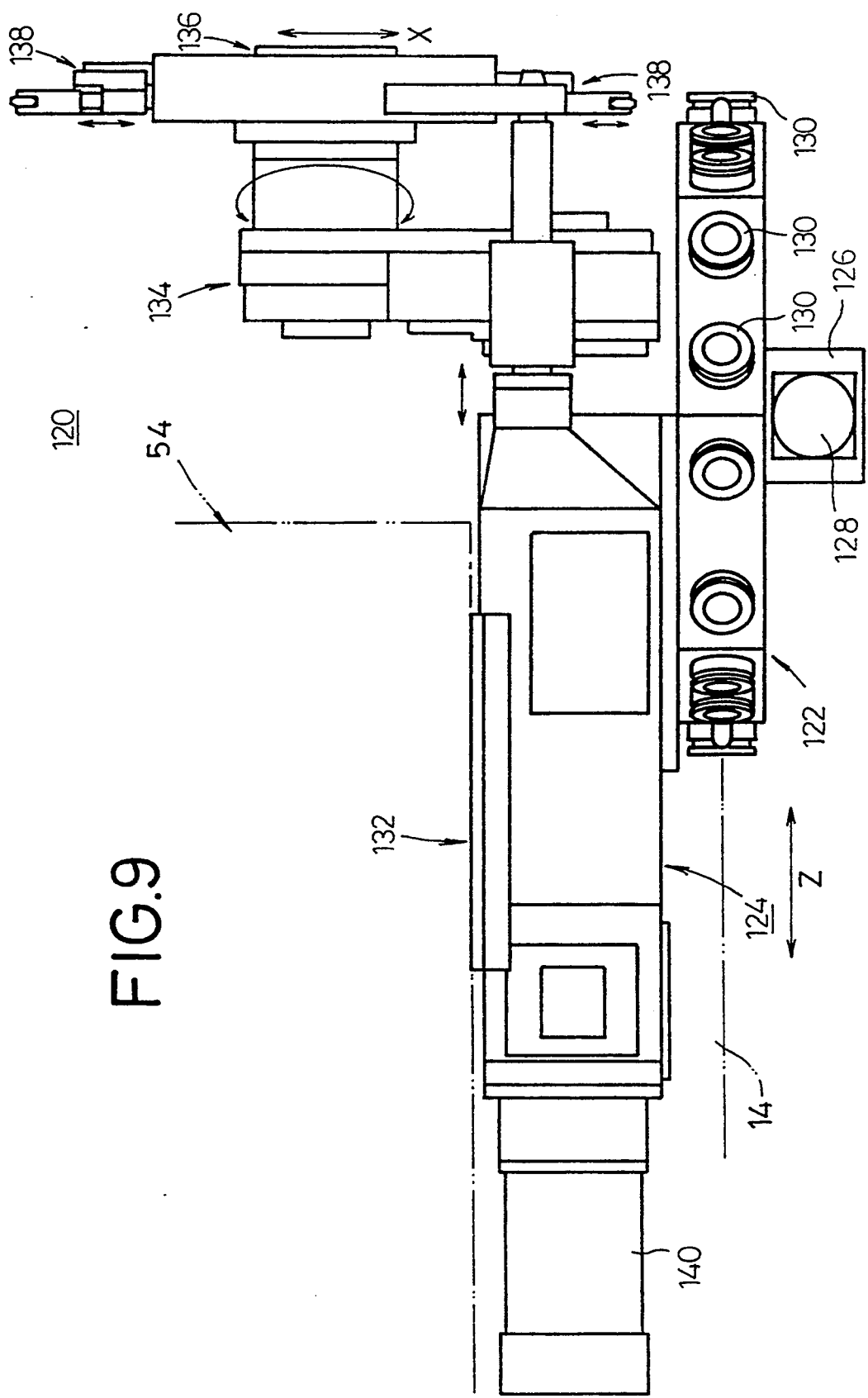
FIG. 9 is a fragmentary plan view showing a tool changer according to one embodiment of the present invention.

The automatic exchange mechanism 124 comprises a drive unit 132 mounted on the side portion of the column 54, a gear case 134 supported by the drive unit 132 so as be movable in the direction (i.e., in the direction indicated by the arrow Z) of the axis of each of the first and second spindle units 34, 36, a casing 136 turnably supported by the gear case 134, and a pair of tool gripping means 138 which is movably mounted on both sides of the casing 136, which extend in the radial direction (i.e., in the direction indicated by the arrow X) and which is capable of simultaneously gripping two or more tools which have been held by the first and second spindle units 34, 36 and the tool magazine 122 (see FIGS. 2 and 9).

Figure 10:
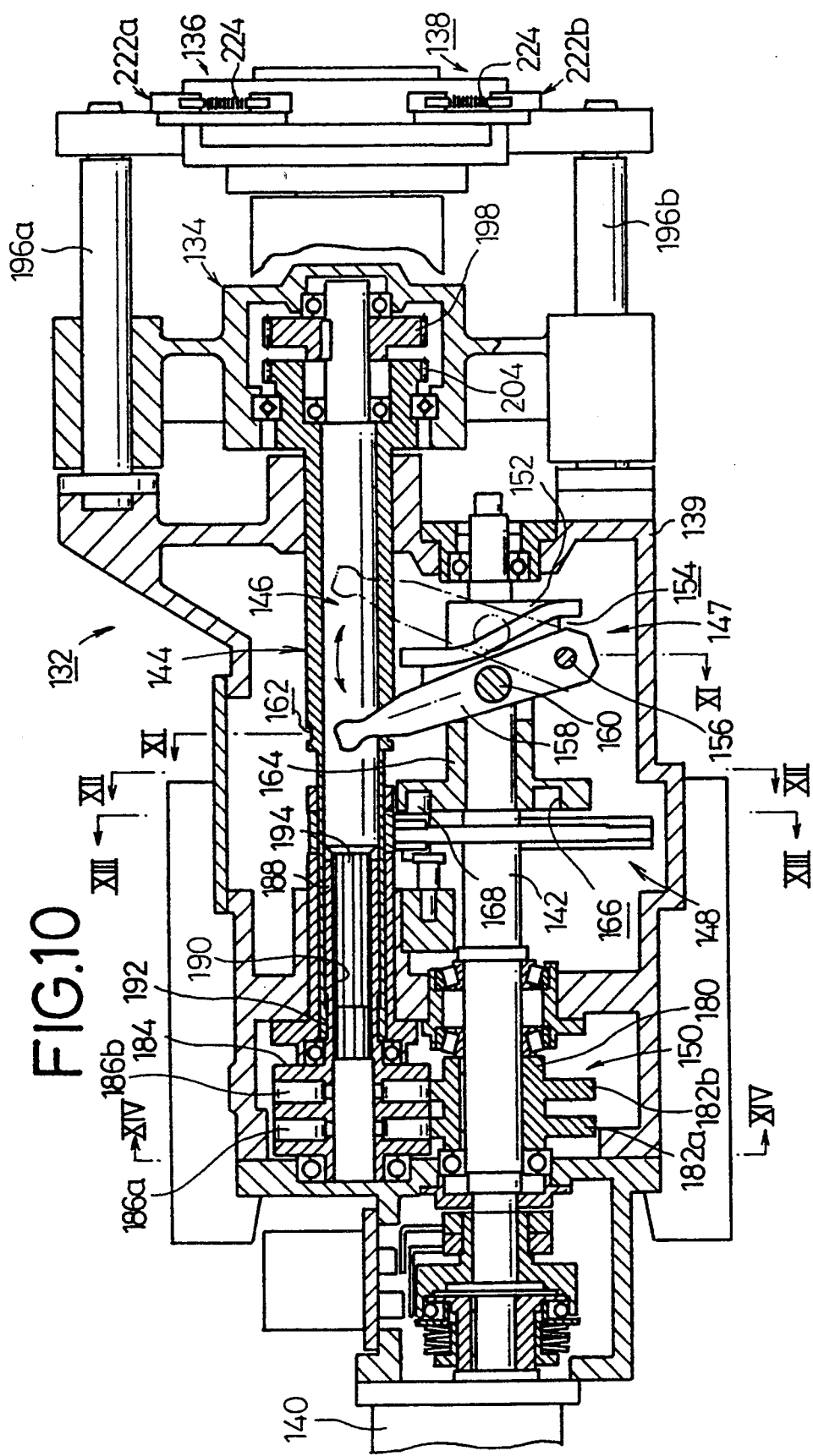
FIG. 10 is a vertical cross-sectional side view showing a drive unit of the tool changer depicted in FIG. 9.

As shown in FIG. 10, the drive unit 132 has a single motor 140 fixed to an end of a housing or casing 139. A rotary shaft 142 is coupled to the motor 140, and a cylindrical drive shaft 144 and a turning shaft 146 are coaxially disposed within the casing 139 so as to extend in parallel to the rotary shaft 142. A first cam means 147 for moving the gear case 134 and the casing 136 back and forth through the rotary shaft 142 and the cylindrical drive shaft 144, a second cam means 148 for moving the tool gripping means 138, 138 back and forth, and a third cam means 150 for turning the casing 136, are provided on the rotary shaft 142 and the cylindrical drive shaft 144.

Figure 11:
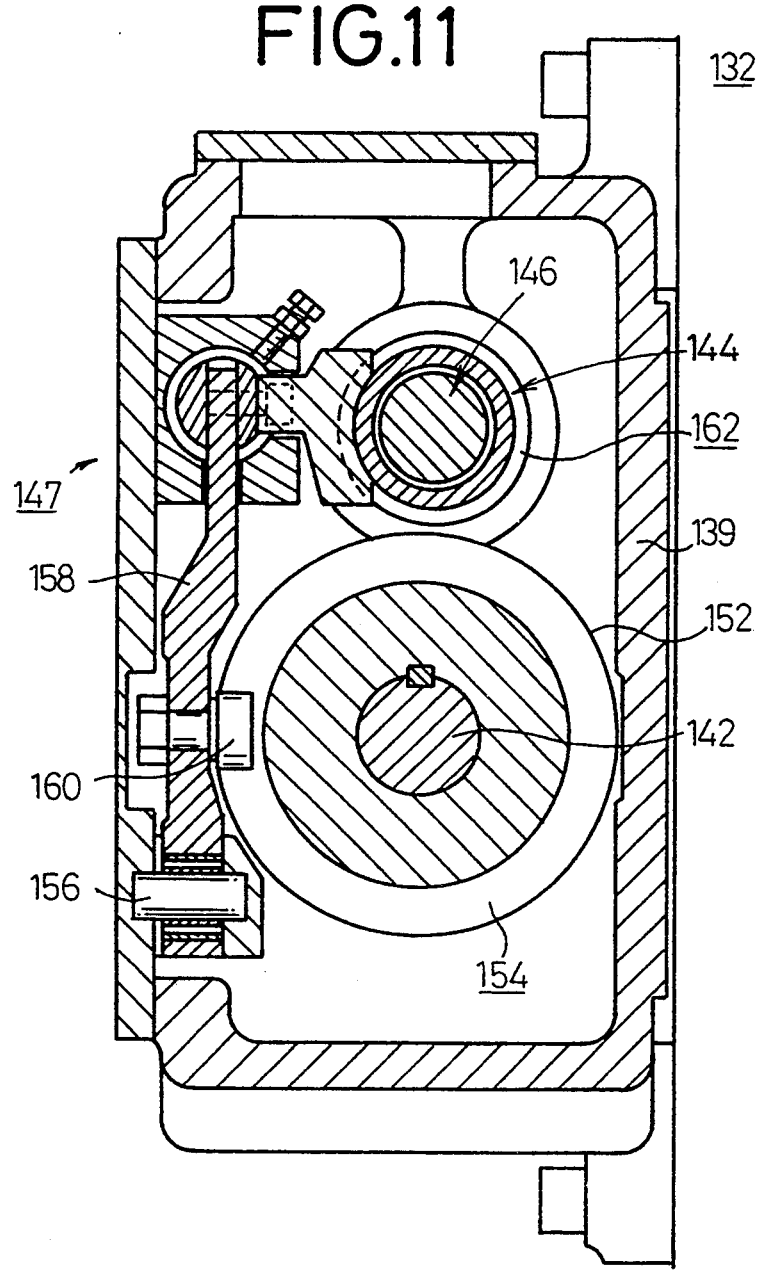
FIG. 11 is a cross-sectional view taken along line XI—XI of FIG. 10.

As shown in FIGS. 10 and 11, the first cam means 147 has a drum cam 152 mounted onto the rotary shaft 142, which includes a screw-shaped cam groove 154 defined in the outer peripheral wall of the drum cam 152. A roller 160 of a swingable arm 158 whose one end is swingably supported by the casing 139 through a pin 156, is fitted in the cam groove 154. The other end of the swingable arm 158 is fitted in a circumferential groove 162 defined in the cylindrical drive shaft 144.

Figure 12:
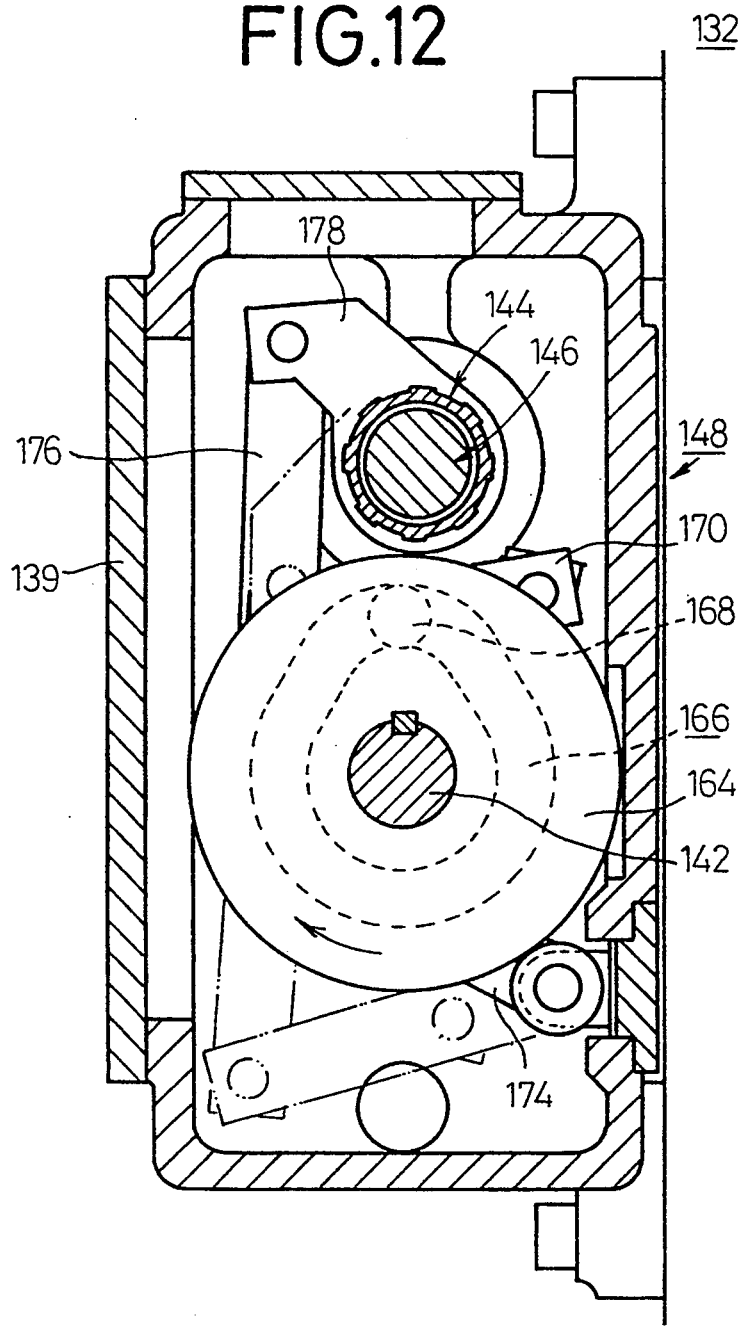
FIG. 12 is a cross-sectional view taken along line XII—XII of FIG. 10.
Figure 13:
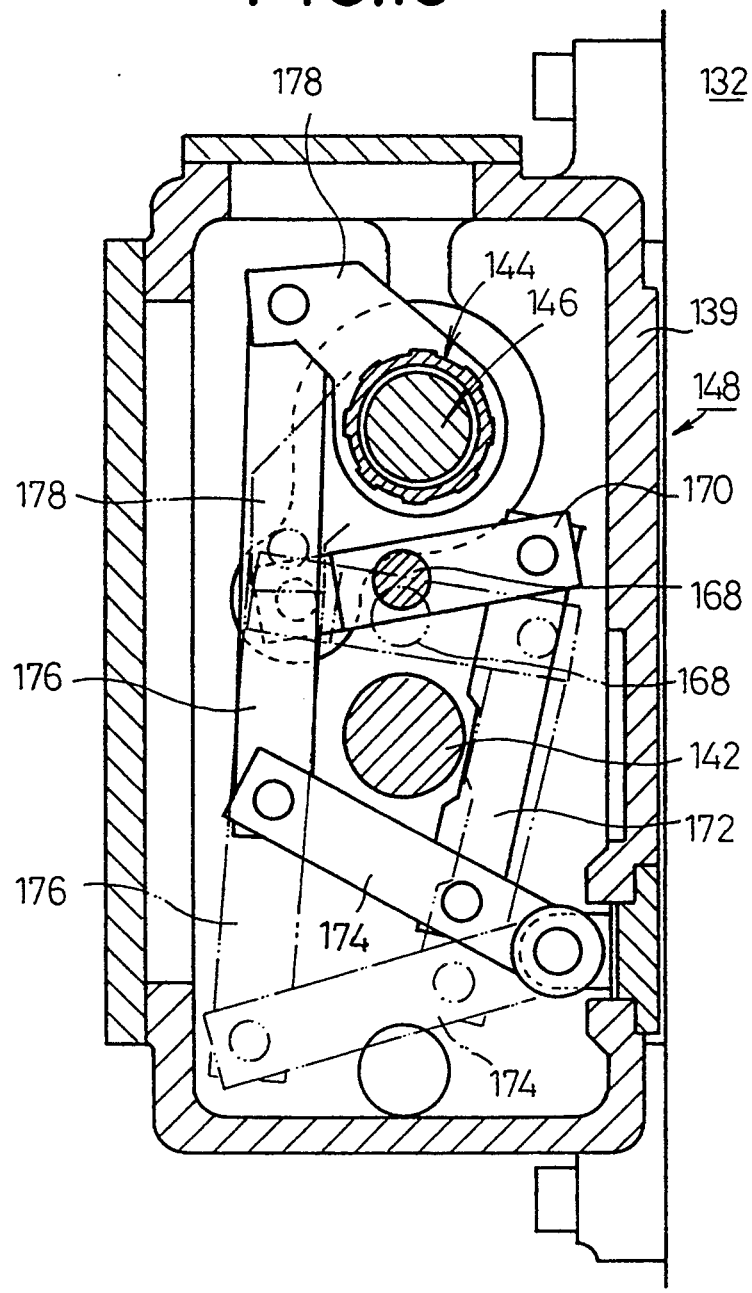
FIG. 13 is a cross-sectional view taken along line XIII—XIII of FIG. 10.

As illustrated in FIGS. 10 and 12, the second cam means 148 has a face cam (cam member) 164 which is mounted onto the rotary shaft 142 and includes a guide groove 166 defined in an end face of the face cam 164. The guide groove 166 is shaped substantially in the form of a ring or circle whose portion extends outwardly. A cam roller 168 is fitted in the guide groove 166. As shown in FIG. 13, the cam roller 168 is attached to a first link 170 which constitutes a link mechanism. One end of the first link 170 is supported by the casing 139 and the other end thereof is brought into engagement with a second link 172. The second link 172 is held in engagement with a third link 174 whose one end is supported by the casing 139 and whose other end is brought into engagement with a fourth link 176. The fourth link 176 engages with a fifth link 178 which is coupled by spline to the cylindrical drive shaft 144 at a position shown in FIG. 10.

Figure 14:
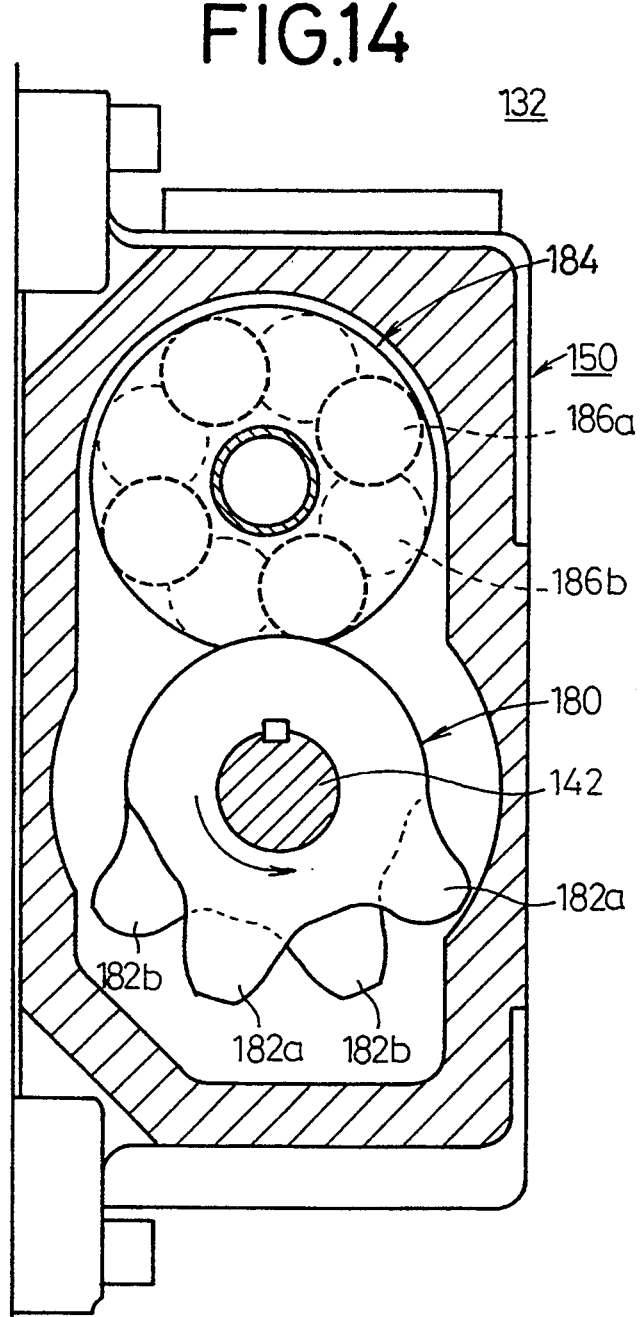
FIG. 14 is a cross-sectional view taken along line XIV—XIV of FIG. 10.

As shown in FIGS. 10 and 14, the third cam means 150 has a parallel cam 180 mounted on the rotary shaft 142. Two pairs of cam portions 182a, 182a and 182b, 182b, which project outwardly from the outer peripheral wall of the parallel cam 180, are brought into engagement with their corresponding cam rollers 186a, 186b rotatably supported by a rotor 184. An outer spline 188 and an inner spline 190 are formed onto a cylindrical portion of the rotor 184, which extend toward the axis thereof. The cylindrical drive shaft 144 is externally fitted on the cylindrical portion. A spline 192 is formed on the inner peripheral wall of an end of the cylindrical drive shaft 144 and brought into engagement with the outer spline 188 when the cylindrical drive shaft 144 is displaced forward by the first cam means 147. The inner spline 190 is held in engagement with a spline 194 formed on the outer periphery of one end of the turning shaft 146 over a predetermined length. The state of engagement of the inner spline 190 with the spline 194 is maintained as it is even if the turning shaft 146 is moved back and forth.

Figure 15:
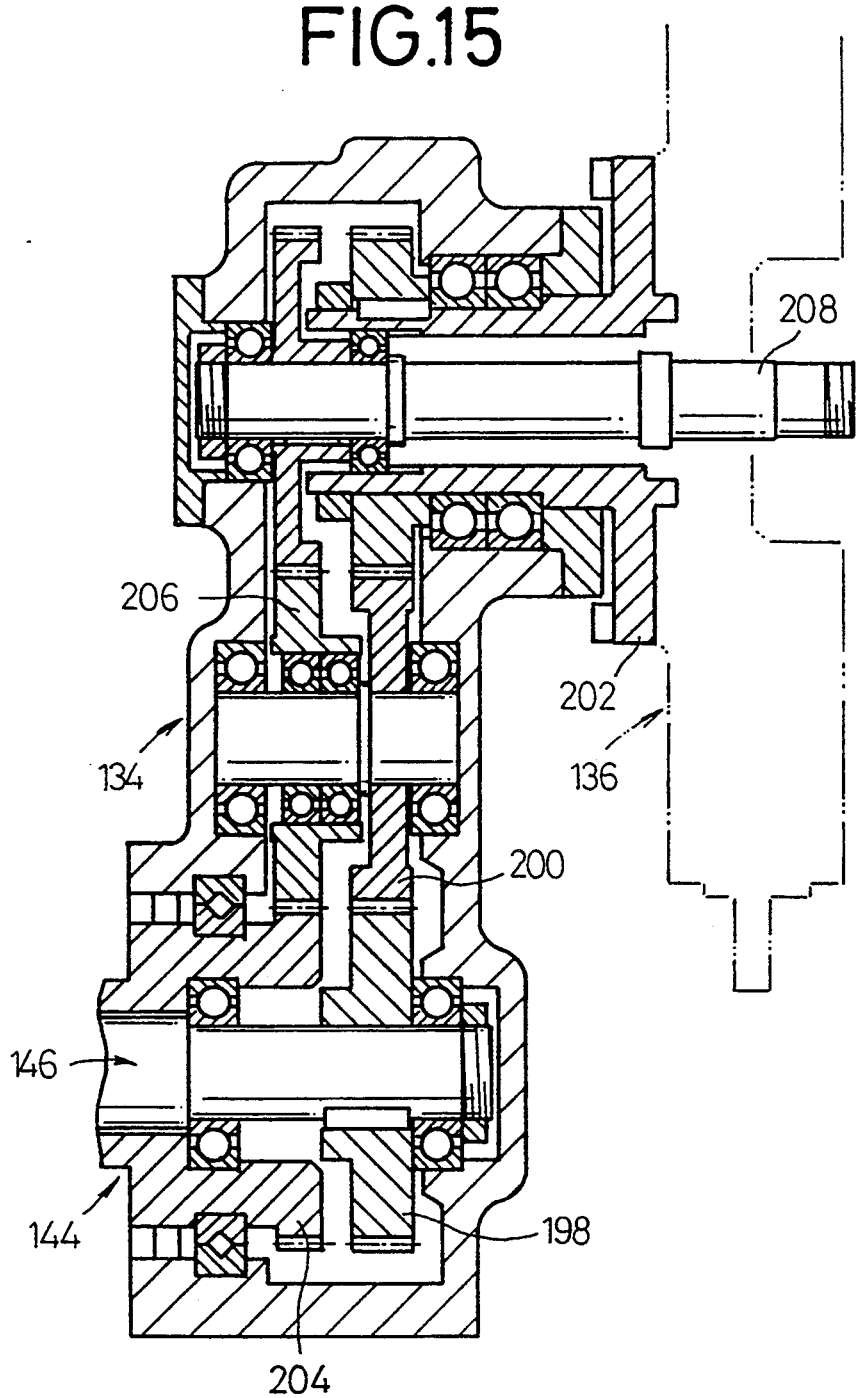
FIG. 15 is a vertical cross-sectional side view illustrating a gear case of the tool changer shown in FIG. 9.

As illustrated in FIGS. 10 and 15, the leading ends of the cylindrical drive shaft 144 and the turning shaft 146 project into the gear case 134. Upper and lower portions of the gear case 134 are supported by guide rods 196a, 196b respectively. A gear 198 is mounted onto the leading end of the turning shaft 146 and coupled via a gear train 200 to a holding barrel or cylinder 202, which is in turn secured to the casing 136. On the other hand, a gear portion 204 is formed on the leading end of the cylindrical drive shaft 144 and coupled via a gear train 206 to a rod 208 whose leading end projects into the casing 136.

As shown in FIG. 16, a relatively large-diameter pinion 210 is mounted on the leading end of the rod 208. The pinion 210 is brought into meshing engagement with rack members 212, 214. The rack members 212, 214 are attached to support plates 216, 218 of the tool gripping means 138, 138 respectively. The support plates 216, 218 are guided in the direction indicated by the arrow X by the casing 136. A pair of chucks 220a, 220b is openably and closably attached to their corresponding upper and lower portions of the support plate 216, whereas a pair of chucks 222a, 222b is openably and closably attached to their corresponding upper and lower portions of the support plate 216. The leading ends of the respective pairs of chucks 220a, 220b and 222a, 222b are pressed in closing directions by their corresponding springs 224. Each of tool positioning members 226 is provided on the leading end side of each chuck.

As shown in FIG. 2, another main body 16a is movably placed on the foundation base 12 through an X table 14a separately from the aforementioned main body 16. First and second housings 60a, 68a are formed on side portions of first and second vertically movable tables 24a, 32a of the main body 16a, which are respectively provided in confronting relationship with the first and second housings 60, 68 of the first and second vertically movable tables 24, 32 of the main body 16. First and second spindle units 34a, 36a are mounted in the first and second housings 60a, 68a respectively. The first and second spindle units 34a, 36a can be placed as close as possible to the first and second spindle units 34, 36 mounted to the main body 16.

Figure 3:
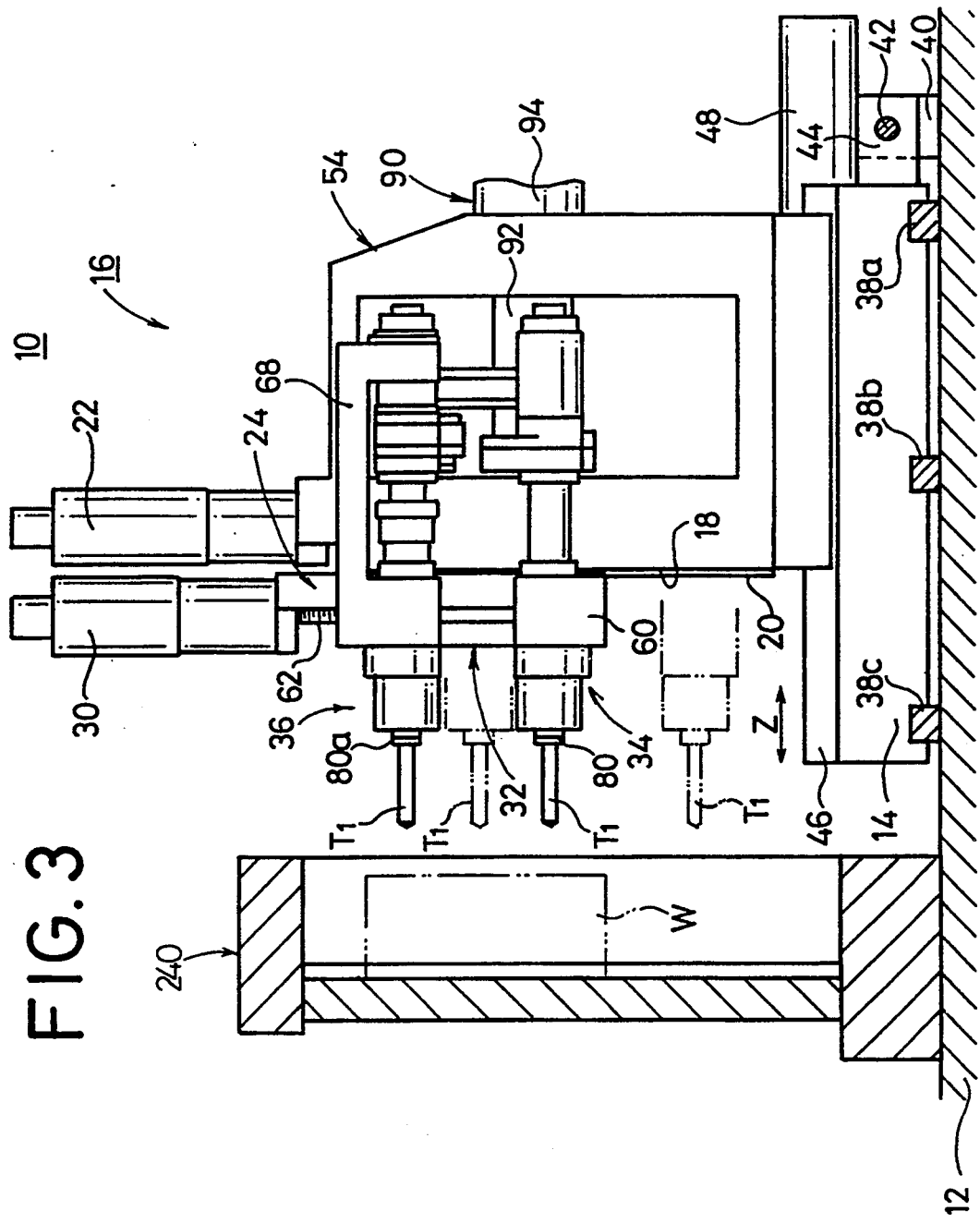
FIG. 3 is a fragmentary side view illustrating the multi-spindle machine tool shown in FIG. 1.

A workpiece mounting base 240 for positioning and holding a workpiece W is disposed in front of the main bodies 16, 16a (see FIG. 3).

The operation of the multi-spindle tool machine 10 constructed as described above will now be described below.

A workpiece W is first positioned and held on the workpiece mounting base 240 in a predetermined machining position. On the other hand, for example, tools $T_1$, $T_1$ are mounted in advance to their corresponding first and second spindle units 34, 36 which have been attached to the main body 16 to meet a machining process of the workpiece W. Then, the first and second spindle units 34, 36 with the tools $T_1$, $T_1$ mounted thereto are integrally rotated by the drive mechanism 90 and positioned so as to correspond to portions of the workpiece W, which are to be machined.

More specifically, the motor 94 of the drive mechanism 90 is energized to cause the drive shaft 100 to rotate the rotary shaft 102, thereby rotating the first and second driving gears 104, 106 mounted onto the rotary shaft 102 in a single unit. Accordingly, the spindle 70 is rotated by both the gear 108 which is brought in meshing engagement with the first driving gear 104 and the gear 74 which is brought into meshing engagement with the gear 108. Further, the tool holder 80 which is held in engagement with the leading end of the spindle 70, is rotated integrally with the tool $T_1$. On the other hand, the gear 110 which meshes with the second driving gear 106 and the gear 112 which meshes with the gear 110, are both rotated to turn the rotary shaft 114 for mounting the gear 112 thereon, thereby rotating the gears 116 and 118 and then turning the spindle 70a under the rotation of the gear 74a. As a result, the tool $T_1$ which is being held by a tool holder 80a, is rotated. Thus, the tools $T_1$, $T_1$ which have been mounted to the corresponding first and second spindle units 34, 36, are integrally driven under rotation.

The first and second servomotors 22, 30 are energized to automatically adjust vertical positions of the tools $T_1$, $T_1$ mounted to the corresponding first and second spindle units 34, 36 according to the portions of the workpiece W, which are to be machined. That is, when the ball screw 56 is rotated under the action of the first servomotor 22, the first vertically movable table 24 is moved upward and downward integrally with the nut 58 threaded onto the ball screw 56 along the guide rails 20, 20. Therefore, the axial center of the first spindle unit 34, which has been mounted in the first housing 60 of the first vertically movable table 24, is positioned so as to be associated with a lower portion (not shown) of the workpiece W, which is to be machined. Further, the second servomotor 30, which has been secured onto the first vertically movable table 24, is energized to cause the ball screw 62 and the nut 64 to move the second vertically movable table 32 upward and downward along the guide rails 28, 28. Accordingly, the axial center of the second spindle unit 36, which has been mounted in the second housing 68, is positioned in confronting relationship with an upper portion (not shown) of the workpiece W, which is to be machined.

Next, the first drive motor 40 is energized to position the first and second spindle units 34, 36 along the direction indicated by the arrow X in correspondence to the workpiece W. That is, when the ball screw 42 is rotated under the energization of the first drive motor 40, the X table 14 is moved integrally with the nut 44 threaded onto the ball screw 42 in the direction indicated by the arrow X along the guide rails 38a through 38c. Therefore, the first drive motor 40 is deenergized when the X table 14 is moved to a predetermined position, thereby making it possible to effect the positioning of the X table 14 in the direction indicated by the arrow X.

On the other hand, the second drive motor 48 is energized to move the tools $T_1$, $T_1$ which have been attached to the corresponding first and second spindle units 34, 36 toward respective machining portions of the workpiece W (i.e., forward as seen in the direction indicated by the arrow Z). That is, when the ball screw 50 is rotated under the action of the second drive motor 48, the column 54 is displaced in the direction indicated by the arrow Z by the nut 52, thereby enabling the tools $T_1$, $T_1$ to be moved toward the workpiece W.

Thus, the respective operations referred to above are selectively effected to enable the tools $T_1$, $T_1$ which have been mounted to the corresponding first and second spindle units 34, 36 and placed under the rotation to automatically machine predetermined machining portions of the workpiece W. After the machining process has been completed, the second drive motor 48 is reversed to move the column 54 so as to be spaced away from the workpiece W, thereby separating the tools $T_1$, $T_1$ from the workpiece W. Then, the workpiece W which has been subjected to the machining process, is taken out from the workpiece mounting base 240. Afterwards, a workpiece W to be newly machined is placed on the workpiece mounting base 240 and subjected to the aforementioned machining process, thereby machining the new workpiece W.

When workpieces W which are different in kind from each other, are then machined, the tool changer 120 according to the present embodiment is activated to exchange the tools $T_1$, $T_1$ mounted to their corresponding first and second spindle units 34, 36 for tools $T_2$, $T_2$, for example, according to the workpieces W different in kind from each other. That is, the tool magazine 122 is rotated a given angle under the action of the motor 128 to thereby stop each of desired tools $T_2$, $T_2$ supported on the outer peripheral wall of the tool magazine 122 at a position to be arranged horizontally. On the other hand, the first and second servomotors 22, 30 are energized to displace the first and second vertically movable tables 24, 32 in upward and downward directions, thereby positioning each of the tools $T_1$, $T_1$ mounted to their corresponding first and second spindle units 34, 36 according to the height of each tool gripping means 138 of the casing 136 of the tool changer 120.

The motor 140 of the drive unit 132 is energized to rotate the rotary shaft 142 coupled to the motor 140. At this time, the guide groove 166 of the face cam 164 of the second cam means 148 is provided in the state shown in FIG. 12. The cam roller 168, which is fitted in the guide groove 166, is moved downward in accordance with the rotation of each of the rotary shaft 142 and the face cam 164. Therefore, as shown in FIG. 13, the first link 170 to which the cam roller 168 has been secured, is swung downward about the casing 139, so that the second link 172 coupled to the first link 170 is displaced. Further, the fifth link 178 is swung by the third and fourth links 174, 176 which engage the second and third links 172, 174 respectively, so that the cylindrical drive shaft 144 is turned to a predetermined angle (see two-dot chain lines in FIG. 13).

When the cylindrical drive shaft 144 is turned, the gear portion 204 formed on the leading end thereof is rotated, thereby turning the rod 208 by the gear train 206 disposed within the gear case 134. The pinion 210 is rotated in the direction indicated by the arrow in FIG. 16 in synchronism with the rotation of the rod 208, thereby moving the rack members 212, 214 held in meshing engagement with the pinion 210 in the direction (i.e., in the direction in which they extend from the casing 136) in which they are spaced away from each other. Thus, the support plate 216 is moved toward the tool magazine 122 to cause the chucks 220a, 220b to hold or grip the tools $T_2$, $T_2$ respectively. Further, the support plate 218 is displaced toward the first and second spindle units 34, 36 to cause the chucks 222a, 222b to grip the tools $T_1$, $T_1$ respectively.

Further, when the rotary shaft 142 is rotated by the motor 140, the roller 160 engaged in the cam groove 154 is displaced to the right as seen in FIG. 10 under the rotation of the drum cam 152 of the first cam means 147 to swing the swingable arm 158 up to the position indicated by the two-dot chain line in FIG. 10 about the pin 156. Therefore, the cylindrical drive shaft 144 is moved forward integrally with the turning shaft 146 through the circumferential groove 162 in which the end of the swingable arm 158 is fitted, so that the gear case 134 into which the leading end of the cylindrical drive shaft 144 is entering and the casing 136, are moved forward along the guide rods 196a, 196b.

In this case, the tools $T_1$, $T_1$ and $T_2$, $T_2$ are held or gripped by the two pairs of tool gripping means 138, 138 of the casing 136. Further, the tools $T_1$, $T_1$ and $T_2$, $T_2$ are respectively taken out from the tool magazine 122 and the first and second spindle units 34, 36. The second cam means 148 and the cylindrical drive shaft 144 are also released from being coupled by spline to each other. The spline 192 of the cylindrical drive shaft 144 is brought into engagement with the outer spline 188.

When the rotary shaft 142 is turned to a given angle, the two pairs of cam portions 182a, 182a, 182b, 182b of the parallel cam 180 of the third cam means 150 are brought into meshing engagement with their corresponding cam rollers 186a, 186b, thereby rotating the rotor 184 a desired angle alone. The rotation of the rotor 184 is transmitted to the turning shaft 146 through the spline 194 held in engagement with the inner spline 190. Thus, the holding cylinder 202 and the casing 136 are integrally turned 180° by both the gear 198 mounted on the turning shaft 146 and the gear train 200.

When the rotary shaft 142 is then rotated, the swingable arm 158 of the first cam means 147 is swung to the left as seen in FIG. 10 to thereby integrally withdraw the cylindrical drive shaft 144 and the turning shaft 146. As a result, the tools $T_2$, $T_2$, which have been held by the corresponding chucks 220a, 220b, are mounted to the first and second spindle units 34, 36 respectively. On the other hand, the tools $T_1$, $T_1$, which have been gripped by the corresponding chucks 220a, 220b, are placed on the tool magazine 122. Further, when the cylindrical drive shaft 144 is withdrawn, it is rotated by the second cam means 148 coupled by spline thereto, thereby moving the support plates 216, 218 in directions to approach each other under the action of each of the pinion 210 and the rack members 212, 214. Therefore, the chucks 220a, 220b and 222a, 222b are separated from the tools $T_2$, $T_2$ and $T_1$, $T_1$, respectively so as to be moved inwardly of the casing 136, thereby completing a tool exchange process (see two-dot chain lines in FIG. 16). Incidentally, the tool exchange process is effected during a period in which the rotary shaft 142 is turned once by the motor 140.

In this case, in the present embodiment, the pair of guide rails 20, 20 is provided on the frontal surface 18 of the main body 16, which extends in the direction indicated by the arrow X. The first vertically movable table 24 is supported by the guide rails 20, 20. Therefore, even if the size of the first vertically movable table 24 in the direction indicated by the arrow X increases, the extension of the first vertically movable table 24 toward the workpiece W does not interfere with the machining of the workpiece W. Accordingly, the portions of the first vertically movable table 24, which are supported by the pair of guide rails 20, 20, i.e., the area thereof to be supported with respect to the column 54 can be sufficiently ensured by setting the size of the first vertically movable table 24 in the direction indicated by the arrow X to a relatively large value, thereby making it possible to effectively keep the rigidity of the first vertically movable table 24 and to reliably hold the first spindle unit 34.

Further, the pair of guide rails 28, 28 is provided on the frontal surface 26 of the first vertically movable table 24, which extends in the direction indicated by the arrow X. The second vertically movable table 32 is supported by the pair of guide rails 28, 28. Therefore, the rigidity of the second vertically movable table 32 can be sufficiently ensured by increasing the area of the second vertically movable table 32 to be supported in the direction indicated by the arrow X, thereby making it possible to reliably hold the second spindle unit 36. As a result, the first and second spindle units 34, 36 can be moved smoothly and highly accurately. Further, the machining work of the workpiece W can be effected with higher accuracy.

Furthermore, the first and second spindle units 34, 36 are mounted on the separately-movable first and second vertically movable tables 24, 32 respectively. The interval between the first spindle unit 34 and the second spindle unit 36 can be set so as to be as close as possible to each other. Thus, even when a plurality of adjacent portions to be machined exist in the workpiece W, two portions can be simultaneously machined by the tools $T_1$, $T_1$ which have been mounted to the corresponding first and second spindle units 34, 36, thereby making it possible to efficiently machine the workpiece W at a time. Further, when workpieces W, which differ in kind from each other are used, the tools $T_1$, $T_1$ can be positionally adjusted according to portions of the workpieces W, which are to be machined, thereby making it possible to provide superb general-purpose properties.

In the present embodiment as well, the main body 16a is provided in addition to the main body 16. Further, the first and second spindle units 34a, 36a are mounted to the main body 16a in opposing relationship to the first and second spindle units 34, 36 which have been attached to the main body 16. Thus, a machining region A of the first spindle unit 34, a machining region B of the second spindle unit 36, a machining region C of the first spindle unit 34a, and a machining region D of the second spindle unit 36a are set so as to be close as possible to one another as shown in FIG. 2. Therefore, the present embodiment can be suitably applied to, for example, a case where four points of a workpiece W are simultaneously machined and a case where four workpieces W which are identical in kind to each other are simultaneously machined. It is also possible to make a greater efficiency in the workpiece machining process.

In the present embodiment, the first and second spindle units 34, 36 are integrally rotated by the drive mechanism 90. Alternatively, drive mechanisms can be mounted to the corresponding first and second spindle units 34, 36 separately from each other, and the first and second spindle units 34, 36 can be independently driven under rotation.

Further, in the present embodiment, the two tools $T_1$, $T_1$, which have been held by the first and second spindle units 34, 36 respectively can be simultaneously replaced with the two tools $T_2$, $T_2$ which have been held by the tools magazine 122 while the single rotary shaft 142 is turned once. It is therefore possible to efficiently carry out the tool exchange work at a time as compared with the case where a single tool is replaced with another tool as in the prior art. Further, processes for changing a plurality of pairs of tools $T_1$ through $T_n$ mutually in a multi-spindle machine tool in particular can be simultaneously effected by simply mounting a plurality of chucks 220a through 220n and 222a through 222n to the support plate 216, 218 respectively.

The tool magazine 122 is fixed to the X table 14 and the drive unit 132 is mounted to the side portion of the column 54. In addition, the gear case 134 and the casing 136 are supported by the drive unit 132 so as to be integrally moved back and forth along the direction indicated by the arrow Z. The casing 136 is turnably provided in front of the first and second spindle units 34, 36. Therefore, the displacement of the column 54 in the direction indicated by the arrow X is not limited by the tool changer 120. Further, workpiece machining ranges of the first and second spindle units 34, 36 can be reliably ensured.

The multi-spindle machine tool according to the present invention can bring about the following advantageous effects.

Since a first vertically movable table is supported on a frontal surface of a main body, the area of the first vertically movable table to be supported with respect to the main body can be selected to a relatively large value and the rigidity of the first vertically movable table can be effectively kept. Further, since a second vertically movable table is supported on a frontal surface of the first vertically movable table, the rigidity of the second vertically movable table can be ensured, thereby making it possible to reliably hold first and second spindle units and to efficiently carry out various machining processes. Furthermore, the first and second spindle units can be disposed closely to each other and away from each other and two machining processes can be simultaneously carried out. A wider usability can also be brought about.

Moreover, the tool changer employed in the machine tool according to the present invention can bring about the following advantageous effects.

Two or more tools, which have been held by spindles and a tool magazine, can be simultaneously and automatically replaced with others by tool gripping means mounted to a casing. Further, a drive unit provided with the tool gripping means is provided on the side of a column and the tool magazine is formed integrally with the column so as to be movable in the radial direction of each spindle, thereby making it possible to reliably ensure a spindle machining range with respect to the radial direction.

Having now fully described the invention, it will be apparent to those skilled in the art that many changes and modifications can be made without departing from the spirit or scope of the invention as set forth herein.

What is claimed is:

1. A multi-spindle machine tool comprising:
  a main body movable toward and away from a workpiece;
  a first vertically movable table supported by a first pair of guide rails, said first pair of guide rails being disposed on a frontal surface of said main body opposing said workpiece, said first vertically movable table being ascended and descended along said first pair of guide rails by a first actuator;
  a second vertically movable table supported by a second pair of guide rails, said second pair of guide rails being disposed on a frontal surface of said first vertically movable table such that said second pair of guide rails are vertically movable with respect to said first pair of guide rails, said second vertically movable table being ascended and descended along said second pair of guide rails by a second actuator;
  first and second spindle units fixed respectively to said first and second vertically movable tables.

2. A multi-spindle machine tool according to claim 1, wherein first and second support members for supporting said first and second spindle units in such a manner that the axes of said first and second spindle units extend in the direction which intersects the frontal surfaces of said first and second vertically movable tables, are respectively formed on side portions, located on the same side, of said first and second vertically movable tables.

3. A multi-spindle machine tool according to claim 1, wherein first and second main bodies are provided side by side, and first and second vertically movable tables mounted on each of said first and second main bodies respectively include first and second support members provided on each of opposite side portions of said first and second main bodies.

4. A multi-spindle tool according to claim 2, wherein first and second main bodies are provided side by side, and first and second vertically movable tables mounted on each of said first and second main bodies respectively include first and second support members provided on each of opposite side portions of said first and second main bodies.

5. A multi-spindle machine tool according to claim 1, wherein said first and second spindle units comprise first and second rotatable spindles, respectively, said first and second rotatable spindles being driven simultaneously by a drive shaft of a single drive motor.

6. A multi-spindle machine tool according to claim 1, further comprising first and second gear assemblies, said first gear assembly operatively connected between said first spindle and said drive shaft, and said second gear assembly operatively connected between said second spindle and said drive shaft.

* * * * *